United States Patent [19]

Broemer et al.

[11] 4,363,879
[45] Dec. 14, 1982

[54] ALKALINE FLUOROBORATE IN FLUOROPHOSPHATE GLASS FREE OF BERYLLIUM

[75] Inventors: Heinz Broemer, Hermannstein; Norbert Meinert, Solms-Albshause, both of Fed. Rep. of Germany

[73] Assignee: Ernst Leitz Wetzlar GmbH, Wetzlar, Fed. Rep. of Germany

[21] Appl. No.: 204,369

[22] PCT Filed: Dec. 19, 1979

[86] PCT No.: PCT/DE79/00149

§ 371 Date: Aug. 20, 1980

§ 102(e) Date: Aug. 18, 1980

[87] PCT Pub. No.: WO80/01274

PCT Pub. Date: Jun. 26, 1980

[30] Foreign Application Priority Data

Dec. 20, 1978 [DE] Fed. Rep. of Germany ....... 2854936

[51] Int. Cl.$^3$ ............................ C03C 3/16; C03C 3/18
[52] U.S. Cl. ......................................... 501/44; 65/134; 65/66; 501/30; 501/47; 501/902
[58] Field of Search ..................... 501/44, 902, 43, 30, 501/47; 65/66, 134

[56] References Cited

U.S. PATENT DOCUMENTS

| | | | |
|---|---|---|---|
| 2,481,700 | 9/1949 | Sun et al. | 501/44 |
| 4,040,846 | 8/1977 | Bromer et al. | 501/44 X |
| 4,142,986 | 3/1979 | Rapp | 501/44 X |
| 4,225,459 | 9/1980 | Faulstich et al. | 501/44 X |
| 4,285,730 | 8/1981 | Sanford et al. | 501/44 |

FOREIGN PATENT DOCUMENTS

| | | | |
|---|---|---|---|
| 781243 | 8/1957 | United Kingdom | 501/44 |
| 617401 | 7/1978 | U.S.S.R. | 501/44 |

OTHER PUBLICATIONS

Laser Program Annual Report–1975–Lawrence Livermore Laboratory–pub. Mar. 1976, pp. 197-202.
Nogami, Y.–Japan Kokai 50-43112 (Apr. 1975 pub'n).
Chem. Abstr. 83 (1975) item 167935j "Fluorophosphate Optical Glass".

*Primary Examiner*—Helen M. McCarthy
*Attorney, Agent, or Firm*—Schwartz, Jeffery, Schwaab, Mack, Blumenthal & Koch

[57] ABSTRACT

Fluorophosphate glass free of beryllium with a refractive index $n_e$ between 1.40 and 1.46, an Abbe value $v_e$ between 85 and 94 and a high positive anomalous partial dispersion value $+\Delta v_e$ between 19 and 28 is described. The glass is melted from a mixture containing as groups of components metaphosphate, fluorides and an alkali fluoroborate in certain proportions expressed in % by weight, in the following manner: the intermixed mixtue is heated to a temperature between 800° and 800° C., the melt refined at a temperature between 900° and 1000° C. for a period of 8 and 25 minutes, homogenized at a temperature between 900° and 1000° C. within a period of time of 5 to 15 minutes, the temperature reduced to a pouring temperature between 575° and 650° C. and the melt poured into casting molds preheated to approximately 320° C., in particular aluminum molds.

5 Claims, No Drawings

ALKALINE FLUOROBORATE IN FLUOROPHOSPHATE GLASS FREE OF BERYLLIUM

BACKGROUND OF THE INVENTION

The subject matter of the invention is a process for the production of a fluorophosphate glass free of beryllium with a refractive index $n_e$ between 1.40 and 1.46, an Abbe value $v_e$ between 85 and 94 and a high anomalous partial dispersion value $+\Delta v_e$ between 19 and 28.

In correcting the so-called "secondary spectrum" of special optical devices the computing optician heretofore had been restricted to the supplemental use of natural or synthetic crystals, for example, the mineral fluorite ($CaF_2$). Because the properties of the material are inadequate for advanced manufacturing methods, for example, complete cleavability on the octahedral planes and the relatively low hardness, attempts have been made recently to develop optical glasses with optical and physical properties similar to those of cubic fluorite, but with better chemical and processing properties. This involves not only the parameter constellation of the refractive index $n_e$ (fluorite: $n_e = 1.4349$) and the Abbe value $v_e$ (fluorite: $v_e = 94.8$), but also additionally the anomalous partial dispersion value expressed as the deviation (positive or negative) from the so-called "standard line" $\Delta v_e$. This value in the case of fluorite amounts to $\Delta v_e = +31.5$.

Fluorophosphate based glasses having additionally positive anomalous partial dispersion values are already known. They are, however, outside the range of the present invention with respect to their $n_e - v_e$ parameter pairs. Thus, a glass with the values of $n_D = 1.38$ and $v = 95.5$ is known from CA-P 570 108, a fluoride glass with $n_D = 1.35$ and $v = 81$ from U.S. Pat. No. 2,716,069, a glass with $n_d = 1.33$ and $v_e = 105$ from GB-P 845 952 and a fluoride glass with $n_D = 1.39$ and $v_e = 99.5$ from U.S. Pat. No. 2,511, 224.

Aside from the fact that the optical positional ranges of these glasses in the n-v diagram differ from those of the glasses produced by the process of the invention, the known glasses without exception contain beryllium fluoride ($BeF_2$) as the glass former. Due to the toxicity of the beryllium compounds, the use of these components of the mixture may be harmful to health during the melting process and the subsequent processing of the glass.

Even though a fluorine containing phosphate glass free of alkalies and beryllium is known from DE-P 1 088 674—it may also contain small additions of $B_2O_3$—the optical properties of the glass with refractive indices $n_d$ between 1.536 and 1.589 and Abbe values v between 66.4 and 72.8 are in an entirely different area of the optical diagram. This is also true for the fluorophosphate glasses known from DE-AS 2 342 484 with $n_e > 1.57$ and $v_e < 70$; for the glasses described in DE-P 1 596 877 with $n_e$ between 1.47 and 1.53 and $v_e$ between 75 and 85 and for an optical glass known from DE-P 1 496 566 with $n_e$ values between 1.53 and 1.55 and $v_e$ values between 62 and 74.

Finally, fluorophosphate glasses have already been described, but these contain as a further component, among others, $B_2O_3$, for these see U.S. Pat. No. 3,656,976 ($n_e$: 1.47 to 1.54; $v_d$: 84.2 to 71.6) and DE-OS 2 024 613 ($n_e$: 1.482, v: 84).

The glasses, however, due to the presence of $B_2O_3$, have lower Abbe values and higher refractive indices.

SUMMARY OF THE INVENTION

It is therefore the object of the present invention to provide a process for the preparation of special optical fluorophosphate glasses that are free of the disadvantages of the known glasses of a similar type.

The object is attained in a process of the afore-mentioned type according to the invention by that a mixture with the following components is melted: either 7 to 15% by weight of $Al(PO_3)_3$ as the sole metaphosphate component, or in the case wherein in place of the aluminum metaphosphate another metaphosphate is used or such a metaphosphate is employed additionally to the aluminum metaphosphate, 0 to 15% by weight of $Al(PO_3)_3$ and/or up to 11% by weight of an alkali metaphosphate, in particular $NaPO_3$, or respectively, 0 to 15% by weight $Al(PO_3)_3$ and up to 5% by weight of at least one alkaline earth metaphosphate, in particular magnesium metaphosphate ($Mg(PO_3)_2$), and/or calcium metaphosphate ($Ca(PO_3)_2$), wherein the sum of all metaphosphates amounts to between 7 and 15% by weight, 0 to 6% by weight lithium fluoride (LiF), 0 to 12% by weight potassium hydrogen fluoride ($KHF_2$), 3 to 12% by weight $MgF_2$, 9 to 28% by weight calcium fluoride ($CaF_2$), 6 to 16% by weight strontium fluoride ($SrF_2$), 4 to 13% by weight barium fluoride ($BaF_2$), 22 to 31% by weight aluminum fluoride ($AlF_3$), wherein the proportion of the alkaline earth fluorides amounts to between 23 and 52% by weight, and 5 to 29% by weight of sodium fluoborate ($NaBF_4$). Additionally, up to 2% by weight of at least one of the following supplemental substances may be added to the mixture; lanthanum fluoride ($LaF_3$), zinc fluoride ($ZnF_2$) and/or cadmium fluoride ($CdF_2$).

DETAILED DESCRIPTION OF PREFERRED EMBODIMENTS

It is of advantage, to melt the above-cited glass mixture in accordance with the following process: heating the intermixed composition in a platinum crucible to a temperature between 700° and 800° C.; refining the melt at a temperature between 900° and 1000° C. for a time between 8 and 25 minutes, homogenizing the melt at a temperature between 900° and 1000° C. within a period of time between 5 and 15 minutes, reducing the temperature to the pouring temperature of between 575° and 650° C., pouring into molds preheated to approximately 320° C., particularly aluminum molds.

The introduction of boron ions by means of the complex compound $NaBF_4$ into the melt prevents the formation of $B_2O_3$ and thus eliminates the negative effect of boric acid (boric acid anhydride) on the anomalous partial dispersion. Furthermore, the fluorophosphate glasses produced by the process of the invention have a lesser tendency to crystallize and may be melted in larger units.

Examples of the composition of the mixture according to the invention are cited in the tables following hereinafter (in % by weight).

TABLE I

| No. of Melt: | 1 | 2 | 3 | 4 | 5 | 6 | 7 | 8 | 9 | 10 | 11 |
|---|---|---|---|---|---|---|---|---|---|---|---|
| $Al(PO_3)_3$ | 7.5 | 7.5 | 10.5 | 10.5 | 10.5 | — | 5.5 | 5.5 | 5.5 | 14.5 | 14.5 |

TABLE I-continued

| No. of Melt: | 1 | 2 | 3 | 4 | 5 | 6 | 7 | 8 | 9 | 10 | 11 |
|---|---|---|---|---|---|---|---|---|---|---|---|
| $NaPO_3$ | — | — | — | — | — | 10.5 | 5.0 | — | — | — | — |
| $Mg(PO_3)_2$ | — | — | — | — | — | — | — | 5.0 | — | — | — |
| $Ca(PO_3)_2$ | — | — | — | — | — | — | — | — | 5.0 | — | — |
| LiF | 4.2 | 4.2 | 6.0 | 4.0 | 3.0 | — | — | — | — | — | — |
| $KHF_2$ | 7.2 | 6.2 | 8.0 | 6.0 | 5.0 | — | — | — | — | 9.0 | 12.0 |
| $MgF_2$ | 5.2 | 5.2 | 4.0 | 5.0 | 5.5 | 6.0 | 6.0 | 6.0 | 6.0 | 6.0 | 6.0 |
| $CaF_2$ | 11.8 | 11.8 | 9.2 | 11.6 | 12.8 | 24.0 | 24.0 | 24.0 | 24.0 | 24.0 | 24.0 |
| $SrF_2$ | 7.8 | 7.8 | 6.0 | 7.6 | 8.4 | 9.2 | 9.2 | 9.2 | 9.2 | 9.2 | 9.2 |
| $BaF_2$ | 5.7 | 5.7 | 4.5 | 5.5 | 6.0 | 6.5 | 6.5 | 6.5 | 6.5 | 6.5 | 6.5 |
| $AlF_3$ | 29.2 | 30.2 | 30.8 | 28.8 | 27.8 | 26.8 | 26.8 | 22.8 | 22.8 | 22.8 | 22.8 |
| $NaBF_4$ | 21.4 | 21.4 | 21.0 | 21.0 | 21.0 | 17.0 | 17.0 | 21.0 | 21.0 | 8.0 | 5.0 |
| $n_e$ | 1.4091 | 1.4098 | 1.4125 | 1.4224 | 1.4255 | 1.4302 | 1.4350 | 1.4383 | 1.4388 | 1.4515 | 1.4539 |
| $v_e$ | 93.71 | 93.90 | 92.58 | 90.99 | 90.79 | 89.24 | 89.76 | 88.93 | 88.93 | 87.17 | 86.57 |
| $\theta'_g$ | 0.4733 | 0.4720 | 0.4734 | 0.4760 | 0.4724 | 0.4713 | 0.4745 | 0.4743 | 0.4753 | 0.4762 | 0.4776 |
| $\Delta v_e$ | +27.8 | +27.0 | +26.6 | +26.9 | +24.9 | +21.9 | +24.7 | +23.7 | +24.3 | +23.3 | +23.6 |

TABLE I A (MOLE %)

| No. of Melt: | 1 | 2 | 3 | 4 | 5 | 6 | 7 | 8 | 9 | 10 | 11 |
|---|---|---|---|---|---|---|---|---|---|---|---|
| $Al(PO_3)_3$ | 18.5 | 18.6 | 25.3 | 24.7 | 24.5 | — | 13.7 | 13.0 | 13.0 | 32.3 | 32.5 |
| $NaPO_3$ | — | — | — | — | — | 11.0 | 4.8 | — | — | — | — |
| $Mg(PO_3)_2$ | — | — | — | — | — | — | — | 8.2 | — | — | — |
| $Ca(PO_3)_2$ | — | — | — | — | — | — | — | — | 8.8 | — | — |
| LiF | 1.0 | 1.0 | 1.4 | 0.9 | 0.7 | — | — | — | — | — | — |
| $KHF_2$ | 5.3 | 4.5 | 5.7 | 4.2 | 3.5 | — | — | — | — | 5.9 | 7.9 |
| $MgF_2$ | 3.0 | 3.0 | 2.3 | 2.8 | 3.0 | 3.8 | 3.5 | 3.4 | 3.3 | 3.1 | 3.2 |
| $CaF_2$ | 8.6 | 8.6 | 6.6 | 8.1 | 8.8 | 19.3 | 17.6 | 16.8 | 16.7 | 15.8 | 15.9 |
| $SrF_2$ | 9.2 | 9.2 | 6.9 | 8.5 | 9.3 | 11.9 | 10.9 | 10.4 | 10.3 | 9.8 | 9.8 |
| $BaF_2$ | 9.4 | 9.4 | 7.2 | 8.6 | 9.3 | 11.7 | 10.7 | 10.3 | 10.2 | 9.6 | 9.7 |
| $AlF_3$ | 23.0 | 23.7 | 23.6 | 21.6 | 20.6 | 23.1 | 21.2 | 17.2 | 17.1 | 16.1 | 16.3 |
| $NaBF_4$ | 22.0 | 22.0 | 21.0 | 20.6 | 20.3 | 19.2 | 17.6 | 20.7 | 20.6 | 7.4 | 4.7 |
| $n_e$ | 1.4091 | 1.4098 | 1.4125 | 1.4225 | 1.4255 | 1.4302 | 1.4350 | 1.4383 | 1.4388 | 1.4515 | 1.4539 |
| $v_e$ | 93.71 | 93.90 | 92.58 | 90.99 | 90.79 | 89.24 | 89.76 | 88.93 | 88.93 | 87.17 | 86.57 |
| $\theta'_g$ | 0.4733 | 0.4720 | 0.4734 | 0.4760 | 0.4724 | 0.4713 | 0.4745 | 0.4743 | 0.4753 | 0.4762 | 0.4776 |
| $\Delta v_e$ | +27.8 | +27.0 | +26.6 | +26.9 | +24.9 | +21.9 | +24.7 | +23.7 | +24.3 | +23.3 | +23.6 |

TABLE II

| No. of Melt: | 12 | 13 | 14 | 15 | 16 | 17 | 18 | 19 | 20 |
|---|---|---|---|---|---|---|---|---|---|
| $Al(PO_3)_3$ | 8.5 | 8.5 | 8.5 | 10.5 | 14.5 | 10.5 | 12.5 | 14.5 | 14.5 |
| $MgF_2$ | 12.0 | 6.0 | 6.0 | 6.0 | 3.9 | 6.0 | 6.0 | 5.1 | 5.7 |
| $CaF_2$ | 24.0 | 24.0 | 24.0 | 28.0 | 17.0 | 24.0 | 24.0 | 21.0 | 23.0 |
| $SrF_2$ | 9.2 | 15.2 | 9.2 | 9.2 | 6.4 | 9.2 | 9.2 | 8.0 | 8.8 |
| $BaF_2$ | 6.5 | 6.5 | 12.5 | 6.5 | 4.4 | 10.5 | 8.5 | 5.6 | 6.2 |
| $AlF_3$ | 22.8 | 22.8 | 22.8 | 22.8 | 24.8 | 22.8 | 22.8 | 24.8 | 24.8 |
| $NaBF_4$ | 17.0 | 17.0 | 17.0 | 17.0 | 29.0 | 17.0 | 17.0 | 21.0 | 17.0 |
| $n_e$ | 1.4321 | 1.4375 | 1.4412 | 1.4435 | 1.4451 | 1.4452 | 1.4505 | 1.4553 | 1.4559 |
| $v_e$ | 90.24 | 90.53 | 89.89 | 88.89 | 86.70 | 88.60 | 87.62 | 85.75 | 86.56 |
| $\theta'_g$ | 0.4725 | 0.4767 | 0.4774 | 0.4752 | 0.4739 | 0.4746 | 0.4755 | 0.4727 | 0.4750 |
| $\Delta v_e$ | +23.7 | +27.0 | +26.8 | +24.3 | +21.2 | +23.6 | +23.2 | +19.3 | +21.8 |

TABLE II A (MOLE %)

| No. of Melt: | 12 | 13 | 14 | 15 | 16 | 17 | 18 | 19 | 20 |
|---|---|---|---|---|---|---|---|---|---|
| $Al(PO_3)_3$ | 20.5 | 19.8 | 19.3 | 23.5 | 31.3 | 23.5 | 27.6 | 31.5 | 31.6 |
| $MgF_2$ | 6.8 | 3.3 | 3.2 | 3.2 | 2.0 | 3.2 | 3.1 | 2.6 | 2.9 |
| $CaF_2$ | 17.1 | 16.5 | 16.1 | 18.5 | 10.8 | 15.9 | 15.6 | 13.5 | 14.8 |
| $SrF_2$ | 10.6 | 16.9 | 9.9 | 13.2 | 6.6 | 9.8 | 9.6 | 8.3 | 9.1 |
| $BaF_2$ | 10.4 | 10.1 | 18.9 | 9.6 | 6.3 | 15.6 | 12.5 | 8.1 | 9.0 |
| $AlF_3$ | 17.5 | 16.9 | 16.5 | 16.2 | 17.0 | 16.2 | 16.0 | 17.1 | 17.2 |
| $NaBF_4$ | 17.1 | 16.5 | 16.1 | 15.8 | 26.0 | 15.8 | 15.6 | 18.9 | 15.4 |
| $n_e$ | 1.4321 | 1.4375 | 1.4412 | 1.4435 | 1.4451 | 1.4452 | 1.4505 | 1.4553 | 1.4559 |
| $v_e$ | 90.24 | 90.53 | 89.89 | 88.89 | 86.70 | 88.60 | 87.62 | 85.75 | 86.56 |
| $\theta'_g$ | 0.4725 | 0.4767 | 0.4774 | 0.4752 | 0.4739 | 0.4746 | 0.4755 | 0.4727 | 0.4750 |
| $\Delta v_e$ | +23.7 | +27.0 | +26.8 | +24.3 | +21.2 | +23.6 | +23.2 | +19.3 | +21.8 |

In the tables, initially the metaphosphate compounds are listed in groups. The most important component of this group is $Al(PO_3)_3$, which is absent in Example 6 only and has been replaced by an equivalent amount of $NaPO_3$. Examples 7 to 9 contain $Al(PO_3)_3$ and additionally a further metaphosphate, i.e. $NaPO_3$ (Example 7), $Mg(PO_3)_2$ (Example 8) and $Ca(PO_3)_2$ (Example 9). By means of these partial exchanges within the metaphosphate component group, planned fine adjustments of the optical parameters ($n_e$, $v_e$, $+\Delta v_e$) may be effected.

The second group includes all "simple" fluorides, i.e., the fluorides of metals with I, II and III valences and hydrogen fluoride. While LiF and KHF$_2$ are used selectively—see Examples 6 to 9 wherein monovalent, simple fluorides are entirely absent—the alkaline earth fluorides of Mg, Ca, Sr and Ba are essential components of this mixture group; they are present simultaneously. This is also true for AlF$_3$, which is to be added to the melting charge in relatively constant amounts. Here again, glass chemists are able to adjust the desired optical values by means of the planned selection of individual components.

The third essential compound is a complex sodium fluoborate that may be added within relatively broad limits. The fluoborates are salts of fluoboric acid and may be prepared by the dissolution of the corresponding metal oxides, hydroxides or metal carbonates in aqueous fluoboric acid (HBF$_4$), see also: HOLLEMAN-WIBERG "Textbook of Inorganic Chemistry", Edition 40–46, Walter de Gruyter & Co., Berlin, 1958, pages 372 and 373, and are to be written in the manner of the chemistry of complexes as: Me$^x$[BF$_4$]$_x$, or as a "complex formula" (see: HOLLEMAN-WIBERG, as cited hereinabove, page 159):

wherein Me signifies "metal" and x the valence of the metal (x=I, II, . . . ).

Finally, in the first vertical column of the tables the optical parameters of the glasses obtained by the process according to the invention are given, i.e., $n_e$=refractive index;
$v_e$=Abbe number (reciprocal value of dispersion);
$\theta_g$=(true) anomalous partial dispersion, wherein $$\theta'_g = \frac{n_g - n_F}{n_F - n_C}$$

wherein the lower indices have the following significance:

g=blue mercury line (435.84 nm),
F'=blue cadmium line (479.99 nm),
C'=red cadmium line (643.99 nm),
+$\Delta v_e$=positive deviation from the "standard straight line", as represented graphically in the drawing of DE-PS 1 496 563. This difference value is being designated in the present description and in the claim—as is generally customary—as the positive anomalous partial dispersion value.

The process for the preparation of the beryllium-free, boron-containing fluorophosphate glasses shall be explained in more detail hereinafter with the aid of the following example of a melt:

A weighed charge of 2 kg, consisting of
10.5% by weight Al(PO$_3$)$_3$
4.0% by weight LiF
6.0% by weight KHF$_2$
5.0% by weight MgF$_2$
11.6% by weight CaF$_2$
7.6% by weight SrF$_2$
5.5% by weight BaF$_2$
28.8% by weight AlF$_3$
21.0% by weight NaBF$_4$, is placed after intensive mixing in portions in a platinum crucible preheated to 750° C. Following the melting of the charge mixture the melt is refined at 950° C. for 10 minutes, homogenized at the same temperature for another 10 minutes under constant agitation, reduced in temperature to the necessary pouring temperature of 600° C. and poured in an aluminum mold preheated to 320° C.

The optical parameters of the glass melted in keeping with the above-described process are as follows:

$n_e$=1.4225
$v_e$=90.99
g=0.4760
$\Delta v_e$=+26.9

The individual time and temperature intervals to be observed during the entire melting process naturally vary as a function of the actual weighed charge. For the formula given, however, they are within the following ranges: the temperature range of the preheated platinum crucible is between 700° and 800° C.; the melt is then refined at a temperature between 900° and 1000° C. within a period of time of 8 to 25 minutes; then homogenized within the same temperature range during a period of 5 and 15 minutes with constant agitation, susequently reduced in temperature to a pouring temperature of 575° to 650° C. and finally poured into a casting mold preheated to approximately 320° C.

As is well known in the technology of glass, it is within the scope of the present invention to add supplemental charges, such as LaF$_3$, ZnF$_2$ and/or CdF$_2$, which have favorable effects on the melting process in a chemical technical sense.

The examples shown in the tables are to be considered representative examples of embodiment. Beyond them, all of the % by weight values covered by the ranges specified in the principal claim for the components listed and for compounds, both anions and cations, that act chemically in a similar manner, may be applied in order to achieve the intended result.

What is claimed is:

1. A fluorophosphate glass free of beryllium and having a refractive index $n_e$ between 1.40 and 1.46, an Abbe value $v_e$ between 85 and 94 and a high positive anomalous partial dispersion +$\Delta v_e$ between 19 and 28 produced by a process comprising melting a mixture consisting essentially of the following components:

(a) methaphosphate(s):
about 7 to 15% by weight Al(PO$_3$)$_3$ alone, or
about 0 to 15% by weight Al(PO$_3$)$_3$ and 0 to 11% by weight of an alkali metaphosphate, or
about 0 to 15% by weight (Al(PO$_3$)$_3$ and about 0 to 5% by weight of at least one alkaline earth methaphosphate, wherein the sum of all metaphosphates is between about 7 and 15% by weight;

(b) fluorides:
about 0 to 6% by weight LiF
about 0 to 12% by weight KHF$_2$
about 3 to 12% by weight MgF$_2$
about 9 to 28% by weight CaF$_2$
about 6 to 16% by weight SrF$_2$
about 4 to 13% by weight BaF$_2$
about 22 to 31% by weight AlF$_3$ wherein the proportion of the alkaline earth fluoride amounts to between about 23 and 52% by weight; and (c) alkaline fluoborate:
about 5 to 29% by weight NaBF$_4$, wherein boron ions are introduced by means of the complex fluoborate to prevent formation of B$_2$O$_3$.

2. A fluorophosphate glass as defined in claim 1, wherein said mixture further comprises from about 0 to 2% by weight of at least one substance selected from the group comprising $LaF_3$, $ZnF_2$ or $CdF_2$.

3. A fluorophosphate glass as defined in claim 1, wherein said alkali metaphosphate comprises sodium metaphosphate $NaPO_3$, and said alkaline earth metaphosphate comprises magnesium metaphosphate $Mg(PO_3)_2$ or calcium metaphosphate $Ca(PO_3)_2$.

4. A fluorophosphate glass as defined in claim 1, wherein the glass is produced by the process steps comprising:
 (a) heating the intermixed mixture to a temperature between 700° and 800° C.;
 (b) refining the melt at a temperature between 900° and 1000° C. for a period of time between 8 and 25 minutes;
 (c) homogenizing the melt at a temperature between 900° and 1000° C. within a period of time between 5 and 15 mintues;
 (d) reducing the temperature to a pouring temperature between 575° and 650° C.; and
 (e) pouring into a casting mold preheated to approximately 320° C.

5. A fluorophosphate glass as defined in claim 1, wherein the mixture contains more than 17% by weight of $NaBF_4$.

* * * * *

UNITED STATES PATENT AND TRADEMARK OFFICE
CERTIFICATE OF CORRECTION

PATENT NO. : 4,363,879

DATED : December 14, 1982

INVENTOR(S) : Heinz Broemer et al.

It is certified that error appears in the above-identified patent and that said Letters Patent is hereby corrected as shown below:

On The Title Page, Item /75/, line 2, "Solms-Albshause" should read -- Solms-Albshausen --.

In The Abstract, line 9, "800°", first occurrence, should read -- 700° --.

UNITED STATES PATENT AND TRADEMARK OFFICE
CERTIFICATE OF CORRECTION

PATENT NO. : 4,363,879

DATED : December 14, 1982

INVENTOR(S) : Heinz BROEMER and Norbert MEINERT

It is certified that error appears in the above—identified patent and that said Letters Patent is hereby corrected as shown below:

Column 3-4, Table I, column 4, kindly delete "1.4224" and insert instead --1.4225--.

Column 5, line 35, kindly delete "θg" and insert instead --θ'g--.

Column 5, lines 36-39, kindly delete "θ'g= $\frac{n_g - n_F}{n_F - n_C}$" and insert instead --θ'g= $\frac{n_g - n_F}{n_{F'} - n_{C'}}$ --.

Signed and Sealed this

Fifth Day of July 1983

[SEAL]

Attest:

Attesting Officer

GERALD J. MOSSINGHOFF

Commissioner of Patents and Trademarks